United States Patent [19]

Nadas et al.

[11] Patent Number: 5,226,164
[45] Date of Patent: Jul. 6, 1993

[54] MILLICODE REGISTER MANAGEMENT AND PIPELINE RESET

[75] Inventors: Stephen J. Nadas, Poughkeepsie, N.Y.; Raymond J. Pedersen, Boca Raton, Fla.

[73] Assignee: International Business Machines Corporation, Armonk, N.Y.

[21] Appl. No.: 690,210

[22] Filed: Apr. 24, 1991

[51] Int. Cl.⁵ .............................................. G06F 9/30
[52] U.S. Cl. .............................. 395/800; 364/232.8; 364/232.9; 364/244.6
[58] Field of Search ................. 364/DIG. I, DIG. II; 395/800

[56] References Cited

U.S. PATENT DOCUMENTS

| | | | |
|---|---|---|---|
| 3,579,192 | 5/1991 | Rasche | 395/375 |
| 3,725,868 | 4/1973 | Malmer | 395/375 |
| 3,793,361 | 2/1974 | Silverstein | 395/375 |
| 4,422,144 | 12/1983 | Johnson et al. | 364/200 |
| 4,443,865 | 4/1984 | Schultz | 395/425 |
| 4,514,803 | 4/1985 | Agnew et al. | 364/200 |
| 4,631,663 | 12/1986 | Chilinski et al. | 364/200 |
| 4,691,278 | 1/1987 | Iwata | 364/200 |
| 4,785,392 | 11/1988 | Maier et al. | 364/200 |
| 4,901,233 | 2/1990 | Liptay | 364/200 |
| 4,972,317 | 11/1990 | Buonomo et al. | 364/200 |
| 5,101,344 | 3/1992 | Bonet | 395/375 |

OTHER PUBLICATIONS

IBM Technical Disclosure Bulletin, vol. 14, No. 1, Jun. 1971, p. 298, entitled "Combined Macro/Micro . . . Machine" by M. Faix et al.

*Primary Examiner*—David Y. Eng
*Attorney, Agent, or Firm*—Bernard M. Goldman; Richard M. Ludwin

[57] ABSTRACT

An alternate instruction architecture which uses the preexisting dataflow and hardware controlled execution units of an otherwise conventional pipelined processor to accomplish complex functions. Additional hardware controlled instructions (private milli-mode only instructions) are added to provide control functions or to improve performance. These milli-mode instructions augment the standard "user visible" architected instruction set (which in the preferred embodiment is the System 390 instruction set). Millicode routines can intermingle the milli-mode only instructions with standard system instructions to implement complex functions. The set of instructions available in milli-mode can be considered to be an alternate architecture that the processor can execute. The millicode and standard system architectures each have there own set of architected registers. However, these registers are dynamically taken from and returned to a common physical register pool under control of a register management system. Provision is also made for communication between the two architectures such that data in the milli-registers and the standard architected registers (such as GPRs) can be exchanged. A set of register operand registers is provided to enable explicit updates of general purpose registers from millicoded routines. Both milli-instructions and standard architecture instructions can be present in the pipeline simultaneously. Provision is thus also made for performing a controlled pipeline reset of the facilities manipulated by the two types of architectures.

11 Claims, 7 Drawing Sheets

FIG. 7

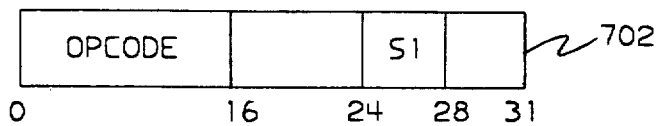

FIG. 8

| \_802 | |
|---|---|
| DIP MILLI-INSTRUCTION S1 VALUES AND ACTIONS | |
| S1 FIELD | TYPE OF PIPELINE DRAIN (SUSPEND DECODING UNTIL:) |
| 0010 | ALL STORE REQUESTS HAVE REACHED THE POINT WHERE NO EXCEPTIONS WILL OCCUR, BUT THE ACTUAL STORE MAY NOT HAVE COMPLETED |
| 0100 | ALL CONCEPTUALLY PREVIOUS MILLI-INSTRUCTIONS HAVE COMPLETED |
| 0110 | ALL CONCEPTUALLY PREVIOUS STORES FROM ALL CONCEPTUALLY PREVIOUS UNIT-OF-OPERATION HAVE COMPLETED (SERIALIZE) |
| 0111 | ABSOLUTE STORE QUEUE EMPTY. ALL PREVIOUSLY ISSUED STORE TYPE REQUESTS HAVE BEEN COMPLETED. THE STORE DATA AND ADDRESS HAVE BEEN ACCEPTED INTO THE L2 STORE STACK. |
| 1000 | ALL CONCEPTUALLY PREVIOUS 390 INSTRUCTIONS HAVE COMPLETED |
| 1010 | DEFER 390 INSTRUCTION FETCHING UNTIL THE DIP COMPLETES AND AN UNCONDITIONAL MEND IS DECODED. AT THE START OF 390 INSTRUCTION FETCHING, I-BUFFERS HOLDING 390 INSTRUCTIONS ARE INVALIDATED. |
| 1100 | ALL CONCEPTUALLY PREVIOUS INSTRUCTIONS HAVE COMPLETED |
| 1110 | DEFER 390 INSTRUCTION FETCHING UNTIL THE DIP COMPLETES AND AN UNCONDITIONAL MEND IS DECODED. |

MILLICODE REGISTER MANAGEMENT AND PIPELINE RESET

I. BACKGROUND OF THE INVENTION

1. Field of the Invention
2. Related Art

IBM System 390 Architecture is classified as a Complex Instruction Set Computing (CISC) architecture. The instruction sets from CISC architectures include both simple instructions (e.g. Load, or Add) and complex instructions (e.g. Program Call, or Load Address Space Parameters). As these computer systems have become more powerful, larger percentages of the instruction set have been implemented using hardware execution units to increase the systems performance. Conventionally, the complex functions are implemented in microcode because building hardware execution units to execute them is expensive and error prone.

Implementing complex functions in microcode provides flexibility to fix problems and expandability in that additional functions can be included later. In machines where much of the processor is hardware controlled, a dedicated microprocessor based execution unit is often provided in order to implement the complex functions. This unit can be microprogrammed to execute complex instructions and complex functions such as handling interrupt conditions. While most of these functions occur relatively rarely, they can execute for tens or hundreds of cycles.

Although the above-described configuration provides flexibility, including a microprocessor execution unit in a computer system with many hardware execution units causes some problems Typically, the path from a microprocessor's control store to the microprocessor itself is critical in that it can effect the system cycle time. This is, in part, because of the need to support multiway branching. In a machine that contains many hardware controlled execution units, there are many other cycle time determining paths. Since much of the processor function is accomplished in hardware execution units, it is desirable to place the microprocessor physically near the hardware execution units so that the microprocessor can have quick access to the results that the hardware execution units generate. Adding a microprocessor execution unit, with its set of critical paths, near the other hardware execution units means adding critical paths in an area that already has many other critical paths.

The complex functions can consume many cycles for their execution. When this happens in a design where the microprocessor is executing the long running function, the remaining hardware execution units may become idle as they wait for the results from the long running function. This is an inefficient use of the available execution units. It is desirable to execute these complex functions as quickly as possible. Further, microprocessor implementation of complex functions requires access to the architected facilities that are being manipulated by the hardware execution units. This implies the need for an increasingly complex interface between the microprocessor and the hardware execution units. The problem is how to provide the flexibility of a microprocessor while not including one in the design.

One solution is suggested in an IBM Technical Disclosure Bulletin article entitled "COMBINED MACRO/MICRO PROGRAM MACHINE" (IBM TDB Vol. 14, No. 1, June 1971, pg.298). To raise the speed of a microprogram controlled computer without essentially increasing the hardware, the same instruction format is adopted for both macro and micro-instructions. This permits designing the hardware so that simple macro-instructions i.e. for simple functions, such as "LOAD REGISTER", "STORE REGISTER INTO MAIN STORAGE", etc., can be directly implemented. More complex macro-instructions involving, for example, floating point and decimal arithmetics are interpreted by micro-instructions which are also directly implementable, using the same hardware. The micro-instructions employed to interpret more complex macro-instructions are also directly used (as simple macro-instructions) in the user program.

Thus, in the above-described system, the user program consists of a sequence of simple micro-instructions and complex macro-instructions. When instructions are implemented, it is determined by testing the operation code whether a current instruction is one that can be directly implemented or is an instruction to be interpreted. This test results in a mode switch being set to either the micro or macro mode. For complex macro-instructions, a branch is taken to an interpretation unit which is a normal microprogram control with control store and instruction sequencer.

Since both the micro-instructions and the simple macro-instructions have the same format, all macro-instructions can be implemented by the instruction execution hardware. Thus, the more complex macro-instructions (as interpreted into micro-instructions by the interpretation unit), as well as the simple macro-instructions (directly appearing in the user program) are transferred to the instruction execution unit.

While the above-described system provides increased flexibility and processing speed, it leaves a number of problems unsolved One problem relates to the manipulation of facilities that are normally not accessible to the architected instruction set. In many instances, it may be necessary or desirable for microcode to have an exclusive ability to manipulate such facilities. In the above described system, there is no provision for giving special access to the micro-instructions coming from the interpretation unit.

Other problems left unsolved by the above-described system include the application of the technique to a parallel and/or pipelined environment, tracking of interpretive instructions as they make their way through the instruction pipeline, managing the micro and macro-instruction registers, and the transfer of operands between the interpretive routines and the macro-instructions that the routines are intended to implement.

II. SUMMARY OF THE INVENTION

The present invention enables implementation of complex functions in a large, hardware controlled, pipelined, general purpose digital computer without incorporating a microprocessor into its design. The invention solves the problem of implementing these functions in this type of computer with the flexibility provided by firmware and avoids a packaging problem introduced by the inclusion of microprocessor hardware.

The present invention uses the preexisting dataflow and hardware controlled execution units of an otherwise conventional pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in the decode logic detects the requirement to enter milli-Mode. This causes millicode routines to be fetched from a millicode array. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

In milli-mode, any architected instruction or private milli-mode instruction that sets the condition code will set a milli-condition code, not the architected system condition code. Further, while in milli-mode, the instructions that are executed refer to milli-registers. For example, an AR 1,2 instruction would add the contents of milli-register 2 to the contents of milli-register 1 and leave the results in milli-register 1.

Although the milli-registers and the system registers (i.e. those accessed in system-mode) are architecturally distinct, an improved register management system, provided in a preferred embodiment of the present invention, enables both architectures to borrow registers from a common register pool. As instructions complete, the physical registers that they use are returned to the register pool and are made available for reuse by both the milli-mode and system system-mode instructions.

Advantageously, the present system enables concurrent execution of dual architectures even in systems having a single execution unit. After the decoder hardware detects a switch from system-mode to milli-mode, there is a period of time where the processor is decoding and executing milli-mode instructions while it is also executing and completing the conceptually previous system-mode instructions. Also, after the decoder detects a switch from milli-mode to system-mode there is a period of time when the processor is decoding and executing System mode instructions while it is also executing and completing the conceptually previous milli-mode instructions.

The provision of an enhanced register management system and the ability to process the dual architectures in parallel makes performance of the pipeline reset function especially challenging. In order to meet this challenge an improved method for performing a pipeline reset function is also provided. The improved method works in conjunction with the improved register management system to provide a correct and efficient pipeline reset function.

Another embodiment of the present invention is directed to solving some of the control and performance problems associated with the updating of general registers, in systems where some complex, interruptible instructions are implemented with millicode. According to this embodiment, a new set of registers, referred to as "Register Operand Registers" are provided The Register Operand Registers solve the control problem and improve the performance characteristics by having the decoder hardware remember information related to the GPRs that are specified by the System instruction that will later be needed in the milli-routine implementing the System instruction.

III. BRIEF DESCRIPTION OF THE DRAWINGS

The present invention will be better understood by reference to the drawing, in which:

FIG. 7 is a diagram illustrating the format of the DIP instruction.

FIG. 8 is a table illustrating the functions performed by the system of FIG. 1 in response to various values of the S1 field of the instruction of FIG. 7.

Like reference numerals appearing in more than one FIGURE indicate like elements.

IV. Detailed Description of the Preferred Embodiments a. Millicode System having Facilities for Register Management & Pipeline Reset Turning now to FIG. 1, an embodiment is shown relating to a computer processor conforming to IBM 390 system architecture. A more detailed diagram of the conventional elements of such a processor can be seen, for example, in U.S. Pat. No. 4,901,233 to John S. Liptay and assigned to the same assignee as the present invention. U.S. Pat. No. 4,901,233 is incorporated by reference, in its entirety, as if printed in full below. While the System 390 environment will be used as an example, it should be understood that the present invention is also readily applicable to other IBM and non-IBM architectures as well (e.g. IBM System 370).

Figure 1:
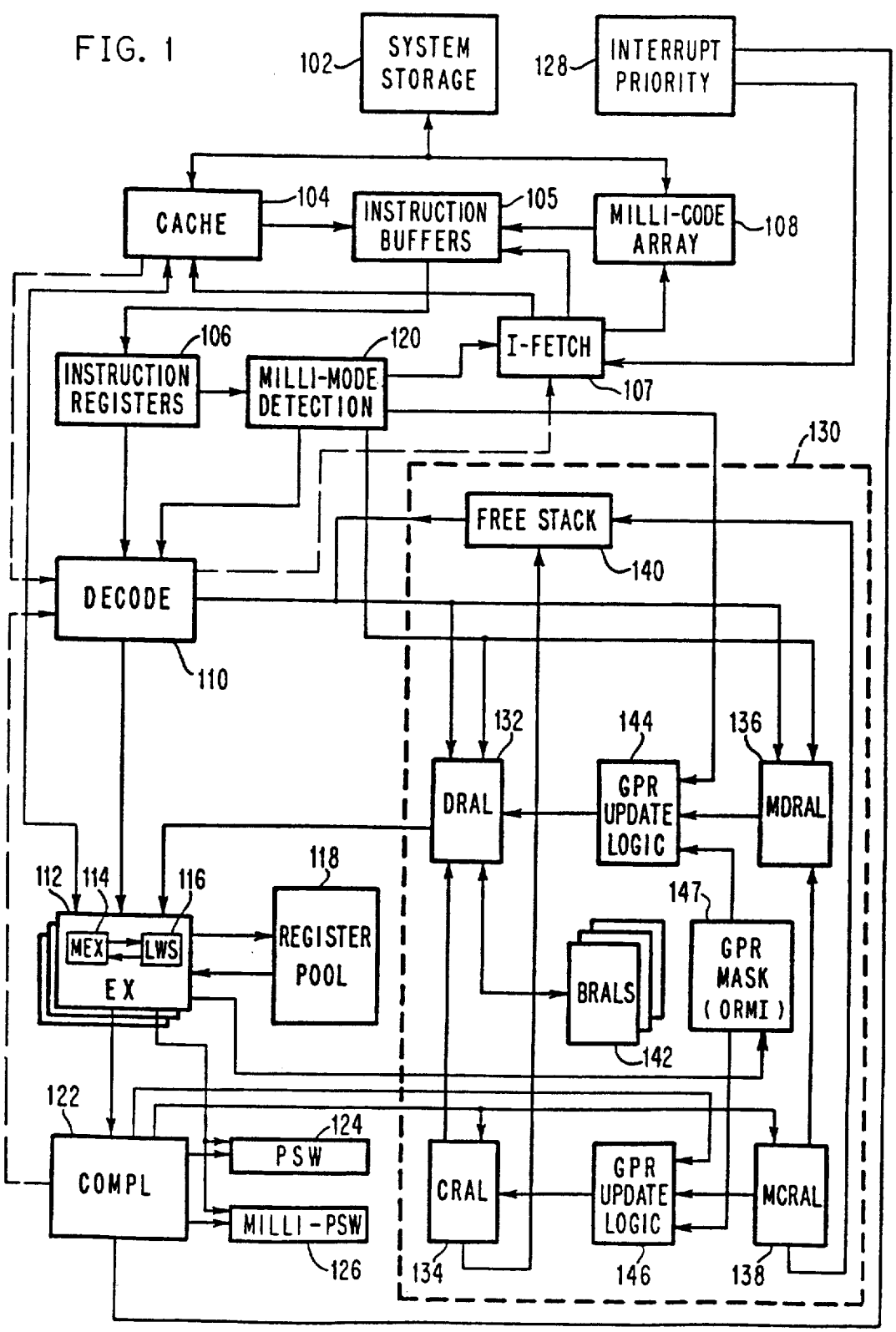
FIG. 1 is a diagram of a computer system having a millicode register management facility.

As is conventional, the system of FIG. 1 includes a system storage (main memory) 102 and a cache memory subsystem (cache) 104. The system storage 102 contains the System 390 instructions that the processor is executing as well as the data those instructions are manipulating. It also contains the system area (memory outside of the program addressable storage) that is used by the millicode (and has other uses). The cache memory subsystem 104 is of a conventional combined data/instruction cache type including conventional cache control logic (a split cache could be used as an alternative). The cache 104 includes a copy of the System 390 instructions that the processor is executing as well as the data those instructions are manipulating.

Instruction buffers 105 are connected to receive instructions from the cache memory subsystem 104 and from a Millicode Array 108 (which will be described in more detail later). The instruction buffers 105 are the source for instructions loaded into the instruction registers 106. The instruction registers 106 are input registers for the decoder 110. Instructions are parsed and placed into the instruction registers (I-REGS). The decoder 110 reads the contents of the I-REGS, decodes the instruction (or causes an operation exception), and schedules the instruction for execution at one or more of the hardware execution elements 112. Signal lines are provided between the decoder 110 and the cache subsystem 104. The decoder 110 uses these lines to track the progress of memory fetch and storage operations.

The Millicode array 108 contains a set of milli-routines. Each milli-routine implements one or more of the complex functions or instructions. The milli-instructions contained in these routines consist of a mixture of regular System 390 instructions and private milli-mode only instructions. The private instructions provide control functions needed by the millicode routines. The set of millicode routines reside outside of program addressable storage.

The instruction fetch control logic (I-FETCH) 107 is the control logic that fetches instructions either from the cache 104 or the millicode array 108. The I-FETCH logic has control inputs from the milli-mode detection logic 120 (to let it know whether to fetch system 390 instructions from the cache or milli-instructions from the millicode array) and from the interrupt priority logic (to let it know what millicode entry address to generate in response to an interrupt). The I-FETCH logic also has a control input from the decoding logic 110 which is used to suspend and resume fetching under circumstances which are explained in the "Drain Instruction Pipeline" section of this document.

The hardware execution elements 112 are where the instructions are actually executed. According to the present invention, at least one of the execution units includes hardware (MEX) 114 to execute the private milli-instructions. The execution unit or units which execute the milli-instructions, have access to a local working storage (LWS) 116 for use by the millicode. The LWS 116 provides the millicode with a means to retain results outside of the architected facilities.

Each of the hardware execution elements 112 has access to a register pool 118. The register pool (RP) 118 is a read write stack of physical registers implemented in the processor to hold the contents of various architected internal registers. For purposes of the present invention, these include the general purpose registers (GPRs) and Milli-Registers (MRs), but any register that changes often enough to warrant backups can be included (e.g. Access Registers, certain Control Registers).

The register pool 118 can be implemented in a number of different ways. For example, each execution unit can have its own identical copy of the register pool. Alternatively, the execution units can share a single common register pool. In any event, the system includes controls (described in more detail later) that regulate how the GPRs and the MRs exchange information.

In accordance with the present invention, the system of FIG. 1 also includes Milli-Mode Detection Logic 120. The Milli-Mode Detection logic 120 is connected to receive the output of the instruction registers 106 and has outputs connected to the decoder 110, the I-FETCH controls 107 and the register management system 130. The Milli-Mode detection logic 120 recognizes when a System 390 instruction being decoded is of a type that is to be interpreted in milli-mode. When this occurs, the Milli-Mode Detection Logic generates an entry point address for the Millicode Array 108 and passes this address along to the I-FETCH controls 107. The detection logic 120 also informs the RMS 130 and puts the decoder into milli-mode (which causes the decoder to allow milli-instructions to be decoded).

The Milli-Mode Detection Logic 120 also recognizes the need for a transition from milli-mode to System 390 mode and causes the decoder to stop recognizing the unique (private) milli-instructions. When in System 390 mode the decoder will not recognize the private milli-mode only instructions and will generate an exception signal if such an instruction is encountered.

The system of FIG. 1 also includes Completion Logic 122. The Completion Logic 122 is where the effects of instructions are made architecturally visible. As will be described in more detail later, the completion logic includes logic that makes it aware of milli-mode. Signal lines are provided between the completion logic 122 and the decoder 110. The decoder 110 uses these lines to track the completion of instructions.

The system of FIG. 1 is of a type that can execute out of conceptual order (i.e the order in which the instructions were logically intended to be presented for execution by the program). In this type of system, instructions complete in conceptual order, even though they may have been executed out-of-order. After an instruction is successfully decoded, it is assigned an identifier (IID). The IID is used to as a tag to track the instruction through execution and completion. IIDs are assigned sequentially (e.g. in a rotation of 32 or 64 numbers) so that the completion logic can determine and ensure completion in the proper conceptual order. In addition, a milli-code bit (explained in more detail later) is set for every IID that is issued in milli-code.

The Program Status Word (PSW) 124 controls execution of the System 390 program. Similarly, the system also includes a Milli-PSW 126 that controls execution of the milli-routine. This provides for a milli-condition code and milli-program counter. Both the Execution Units 112 and the Completion Logic 122 are connected to read from/write to the PSW and the Milli-PSW. Thus, at any given point the execution units or the completion logic can read or update the appropriate one of the PSW and/or Milli-PSW.

The system also includes interrupt priority logic 128 that prioritizes the System 390 mode interrupts and is aware of milli-mode.

The system of FIG. 1 also includes a register management system (RMS) 130. The RMS manages the assignment of registers in the register pool 118 and provides for the transfer of data between milli-registers and general purpose registers. The RMS 130 includes a Decode Register Assignment List (DRAL) 132, a Completion Register Assignment List (CRAL) 134, a Millicode Decode Register Assignment List (MDRAL) 136, a Millicode Completion Register Assignment List (MCRAL) 138, a FREE STACK 140, Back-up Register Assignment Lists 142 and GPR update logic 144, 146. It should be understood that each of the register assignment lists is connected to control logic (not shown) that enables the transfer of data between connected RALs (and RALs coupled via the GPR update logic).

The DRAL 132 is a list that defines the current mapping for general purpose registers (GPRs) to physical register identifiers. The DRAL 132 may be organized in different ways. Preferably, the DRAL contains one position for each architected GPR, and that position contains the identification number (ID) of the physical register in the register pool 118 that has been most recently assigned to receive data for that GPR.

The CRAL 134 has the same basic structure as the DRAL 132. The CRAL 134 records the same type of information as the DRAL, but refers to Completion time as opposed to Decode time. The contents of the CRAL represent the architected state of the general purpose registers and are used to initialize the DRAL on a pipeline reset.

The Millicode Decode Register Assignment List (MDRAL) 136 is connected to exchange data with the DRAL 132. The MDRAL is a list that defines the current mapping for milli-registers (MR's—these are analogous to GPRs while in milli-mode) to physical register identifiers. The MDRAL is preferably organized similarly to the DRAL, with each position in the MDRAL corresponding to a different one of the architected milli-registers and containing the ID of the physical register in the register pool 116 that has been most recently assigned to receive data for that milli-register.

The register pool 118 is addressed by physical register IDs that result from reading the DRAL 132 and the MDRAL 136. Each ID addresses a unique register in the register pool 118.

Figure 2:
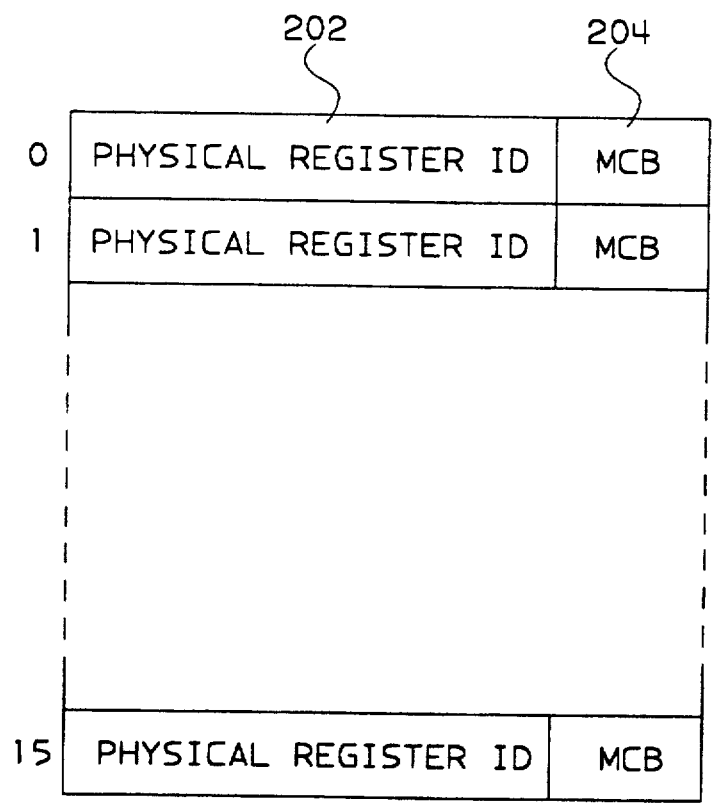
FIG. 2 is an illustrates the format of each entry in the MCRAL of FIG. 1.

The Millicode Completion Register Assignment List (MCRAL) 138 has the same structure as the CRAL with the addition of a millicode bit (MCB). The format of a MCRAL entry is illustrated in FIG. 2. As with the DRAL, CRAL and MDRAL, the MCRAL includes one entry for each architected (logical) register. Each entry includes a first field for holding a physical register ID 202 and a second field for holding a millicode bit 204. The millicode bit 204 is used in the maintenance of the FREE STACK 140 and will be described in more detail later.

The MCRAL 138 is connected to the MDRAL 136 in a manner similar to the way the CRAL 134 is connected to the DRAL 132. The MCRAL records the same type of information as the MDRAL, but refers to milli-instruction completion time. The contents of the MCRAL 138 represent the architected state of the milli-registers registers and are used to initialize the MDRAL on a pipeline reset.

The back-up register assignment lists (BRALs) 142 each have the same basic structure as the DRAL 132. The BRALs 142 are connected to receive the entire contents of the DRAL 128 at particular points of operation. The register management system could work with no BRALs if the system was allowed to wait for branch resolution. The use of one, two or three BRALs allows the processing of one, two or three conditional branches respectively, without waiting. The BRALs 142 are used, for example, when a conditional branch is encountered to save the contents of the DRAL in case the guess as to whether the branch taken is wrong. The MDRAL can also be connected to the BRALs 142 and can share the BRALs 142 with the DRAL 128. Alternatively, the system can be provided with one or more millicode BRALs (MBRALs) that operate in a similar manner as the BRALs 142. The operation of the BRALs is explained in more detail in U.S. Pat. No. 4,901,233.

The FREE STACK 140 is a list of physical register IDs that are presently unused and are available to be allocated to an instruction being decoded. It can be implemented as a "push down stack" for cycle time reasons, but other functionally equivalent implementations can alternatively be used. When the CRAL is updated by an instruction that has completed, the physical register ID that is replaced in the CRAL is no longer needed by the instruction stream being executed and can therefore be given back to the FREE STACK 140 to be reallocated.

The Register Management System 130 of FIG. 1 also includes two independent GPR update logics 144, 146. The first GPR update logic 144 is connected to perform a masked copy from the MDRAL 136 to the DRAL 136. The masked copy function is initiated by the Milli-Mode detection logic, in response to recognition of a MEND instruction. The second GPR update logic 146 is connected to perform a masked copy of the MCRAL 138 to the CRAL 134. The masked copy function of the second GPR update logic is initiated by the Completion Logic 122, in response to completion of a MEND instruction.

Figure 5:
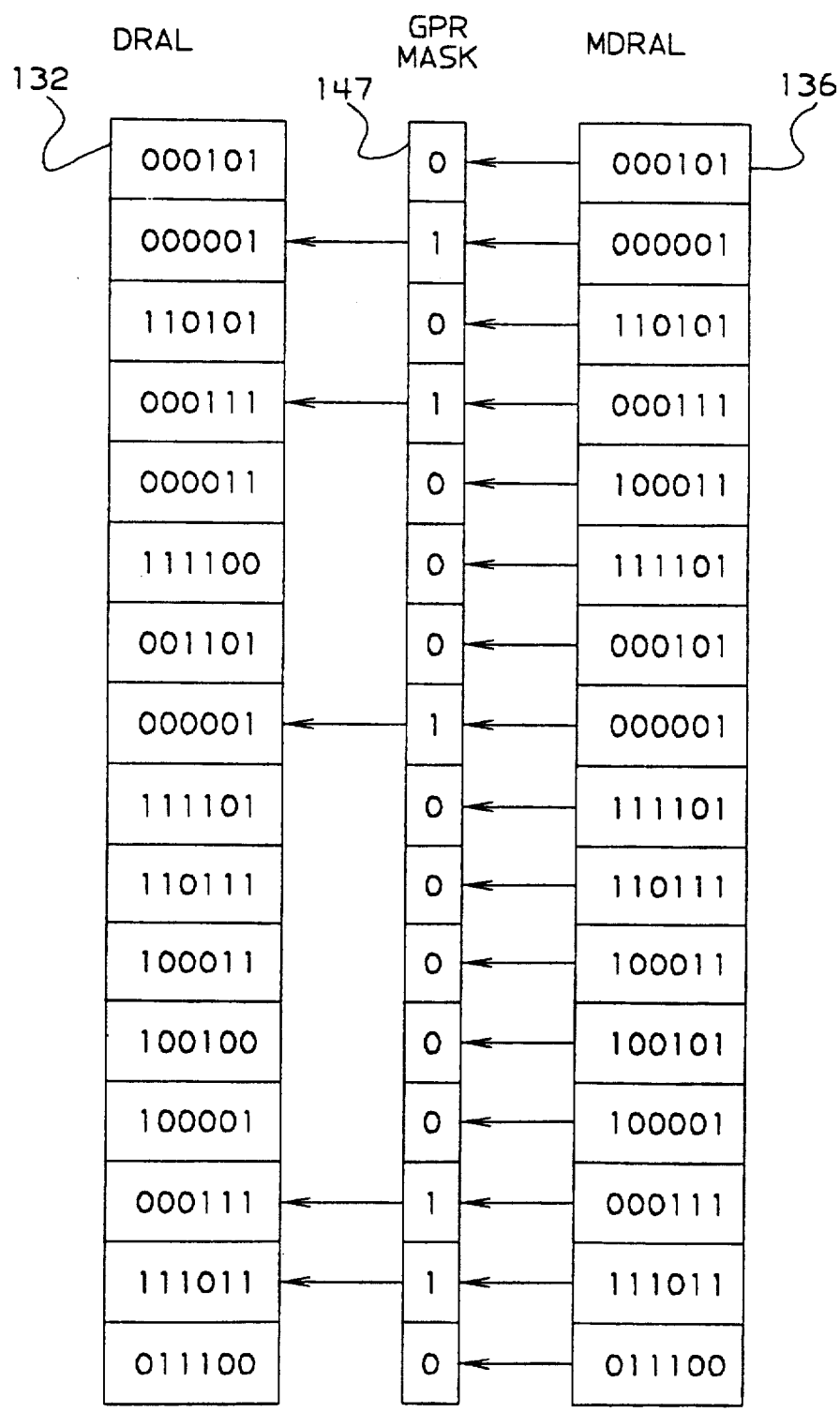
FIG. 5 is an illustration of how the general register mask of the GPR update logic interacts with the MDRAL and the DRAL of FIG. 1.

Each of the update logics 144, 146 includes a sixteen bit mask (one per GPR) which is optionally set in millicode mode (via execution of millicoded mask manipulation instructions by the execution units) to indicate that a milli-register's contents are to be transferred to the corresponding GPR. An example of a masked update of the DRAL from the MDRAL using a mask 147 from the the first GPR update logic 144 is illustrated in FIG. 5. As will be apparent from FIG. 5, only the GPR positions designated by a '1' in the mask 147 will be loaded with the physical register ID from the corresponding MDRAL, when the MEND instruction is detected by the detection logic 120. The second update logic mask operates similarly on the MCRAL and CRAL, in response to completion of the MEND instruction.

When processing instructions in System 390 mode, the decoder 110 examines instructions in sequence to determine the set of logical registers to be read and/or modified by each instruction. For each logical register to be modified, a new physical register is selected from the FREE STACK 140 and the DRAL 132 is updated to reflect the assignment of the physical register to receive the results for the logical register. For each register to be read, the DRAL 132 is accessed to determine which physical register corresponds to the register number specified by the instruction. In this way, each instruction which uses a GPR is directed by the DRAL to find the physical register which is assigned due to the most recent instruction to modify that GPR. The ID(s) of the assigned physical register(s) is passed along with the instruction to an execution unit 112.

Figure 3:
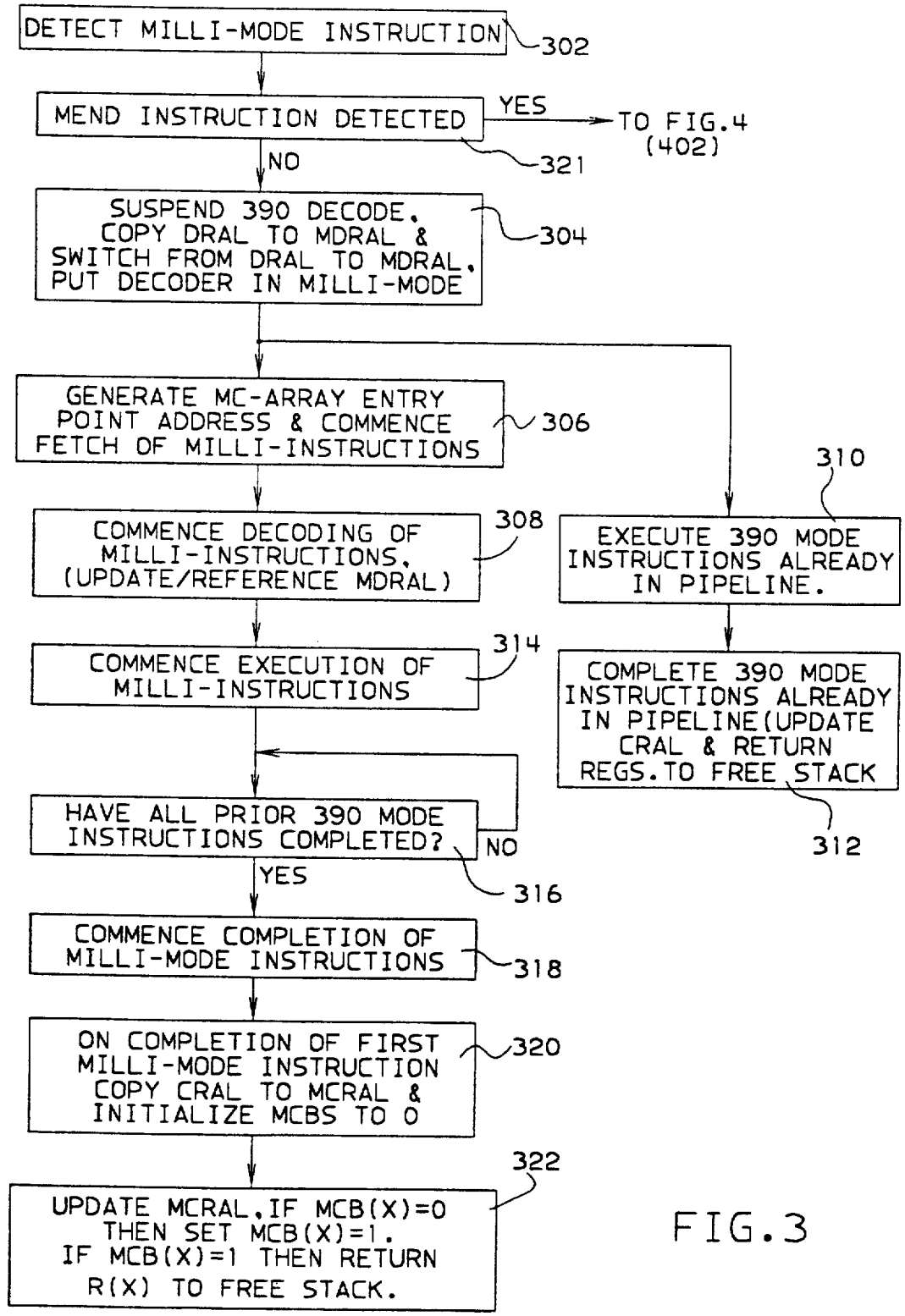
FIG. 3 is a flow chart showing the transition from 390-Mode to Milli-Mode in the system of FIG. 1.
Figure 4:
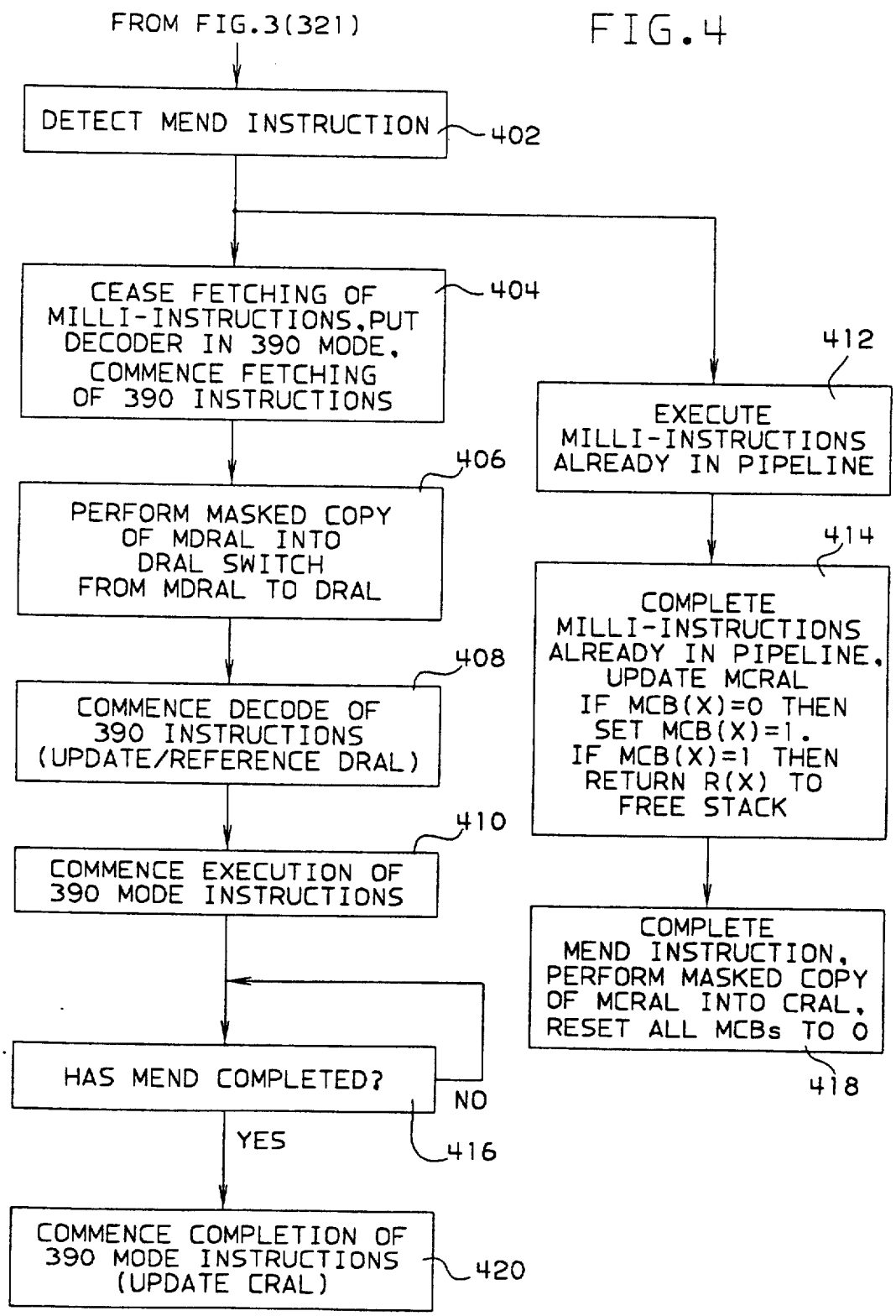
FIG. 4 is a flow chart showing the transition from Milli-Mode to 390-Mode in the system of FIG. 1.

The transitions from 390 mode to millicode mode and back again will now be described by reference to FIGS. 3 and 4. At the start, it is assumed that the processor is decoding and completing 390 instructions.

Milli-Mode is enabled when the Milli-Mode detection logic 120 recognizes that the System 390 instruction being decoded is to be implemented with millicode (Block 302). In response to this recognition, the detection logic 120 signals the decoder 110, the instruction fetch controls 107 and the register management system 130. In response to the milli-mode recognition signal from the detection logic 120, the decoder 110 suspends 390 mode decoding, the register management system 130, freezes the DRAL and then copies the contents of the DRAL into the MDRAL, the milli-mode detection logic 120 generates a millicode array entry point address (which it passes to the I-FETCH control logic 107), and the instruction fetch control logic 107 switches fetching from the cache 104 to the millicode array 108. Also, after the copying, the register management system switches to the MDRAL, activating it as the list into which subsequent register assignments will be recorded (Block 304).

The entry point address (generated by the milli-mode detection logic 120) is used by the I-FETCH control logic 107 to address the millicode array 108 and the initial milli-instructions are fetched from the millicode array 108 (Block 306). These milli-instructions are sent to the Instruction Registers 106 (via the instruction buffers 105) where the decoder 110 decodes them and schedules them for execution at the appropriate hardware execution units 112 (Block 308).

When the processor enters milli-mode, it executes (Block 310) and completes (Block 312) the System 390 instructions already in the pipeline conceptually prior to the instruction that caused entry into milli-mode. As the processor completes the 390 mode instructions, it updates the appropriate logical register positions in the CRAL with the physical register assignments for the completed instructions and returns the previously assigned physical registers to the FREE STACK 140. At the same time, the processor decodes (Block 308) and executes (Block 314) the milli-instructions that implement the System 390 function that caused entry into milli-mode.

At some point the System 390 instruction immediately prior to the instruction that caused entry to milli-mode will be completed by the completion hardware 118 (this condition is tested for at Block 316). Only then does the processor begin to complete the milli-instructions (Block 318). The processor then continues, decoding, executing and completing the milli-instructions.

When completion of the first Milli-instruction in Milli-mode is detected by the Completion Logic 122, the Completion Logic causes the CRAL 134 be frozen to reflect the state of completion of the last 390 instruction. The completion logic then signals the RMS 130 to initialize the MCRAL with the contents of the CRAL (by copying the CRAL into the MCRAL) and the causes the MCRAL 138 to be subsequently updated by completion of Milli-instructions (Block 320).

Once the transition from 390 to Milli-mode is accomplished (and the last 390 instruction already in the pipeline has completed), the processor is performing the following actions:

Milli-instructions are decoding and executing (updating the MDRAL).

Milli-instructions are executing and completing (updating the MCRAL).

As milli-instructions complete, the MCB in the MCRAL is used to control the transfer of register IDs to the FREE STACK 140.

Register IDs are normally returned to the FREE STACK 140 by the CRAL 134 as instructions complete and the physical-to-logical register mapping is changed (Block 318). The initial state of the MCRAL 138 is set equal to the CRAL 134 when the first milli-instruction is completed (Block 320). The CRAL mapping is preserved until MEND is completed; only then is the CRAL changed according to the GPR update logic and the FREE STACK 140 updated from the CRAL modification. As milli-instructions complete, the MCRAL is updated and the milli-mode physical-to-logical mapping is changed (Block 322).

Consider how the MCRAL is managed. If the MCRAL were to operate the same as its counterpart, the CRAL, a completing milli-instruction would update the MCRAL and return the old contents to the FREE STACK. This, however, would effect the CRAL mapping as well, since the MCRAL is initialized to the state of the CRAL and we would be returning the CRAL ID back to be reused by the system. The correct CRAL mapping would, therefore, not be preserved.

If MCRAL updates never returned IDs to the FREE STACK until the completion of MEND, some register IDs would be lost forever. For example, if two milli-instructions modify the same register prior to MEND completion, the register ID assigned to receive the first modification must be returned to the FREE STACK on completion of the instruction that made the second modification to that logical register.

The millicode bit (MCB) 204 is added to the MCRAL to control the FREE STACK updates before MEND. The millicode bit (in each MCRAL entry) is initialized to zero at the completion of the first milli-instruction in a milli-routine (STEP 320). When the MCRAL is updated by a completing milli-instruction, the MCB is examined (Block 322). If the MCB is zero, no update is made to the FREE STACK and the MCB is set equal to 1. If the MCB is equal to one when the MCRAL update is made, the FREE STACK is updated with the old contents of the MCRAL. In this way, the CRAL is preserved until MEND and the registers used only for millicode are returned to the FREE STACK.

At MEND, all MCRAL entries that are not set into the CRAL via the GPR update logic and whose MCB is equal to one are sent to the FREE STACK, since these are IDs that were also only required by the milli-routine.

Eventually, the detection logic 120 recognizes a millicode END (MEND) milli-instruction (Blocks 324 & 402). Handling of the MEND instructions and the transition from Milli-Mode to 390-Mode is illustrated in FIG. 4.

When the detection logic 120 detects an MEND milli-instruction, it causes the processor to cease fetching milli-instructions from the millicode array. Further, when MEND is detected, the detection logic puts the decoder in 390 mode and causes the processor to begin fetching 390 instructions. If GPRs are to be updated by the millicoded function (indicated by the GPR Mask), the contents of the DRAL corresponding to the GPR Mask are set from the contents of the MDRAL corresponding to the GPR Mask. Next, the RMS switches from the MDRAL to the DRAL for recording register assignments (Block 406). The decoder 110 then begins to decode 390 instructions (Block 408).

Once the transition from millicode to 390 is accomplished, the processor is performing the following actions in parallel:

390 instructions are decoding and executing, thereby updating the DRAL (Blocks 408, 410);

Milli-instructions already in the pipeline are executing and completing, thereby updating the MCRAL (Blocks 412, 414).

Completion of a MEND milli-instruction (detected in Block 416) causes the processor completion logic to begin completing 390 instructions (Block 418). If GPRs are to be updated by the millicoded function (indicated by the GPR Mask), the contents of the CRAL corresponding to the GPR Mask are set from the contents of the MCRAL corresponding to the GPR Mask (Block 418). The completion logic then begins to complete 390 instructions (Block 420), thereby updating the CRAL.

Another way that the processor can enter milli-mode is in response to an interrupt. When the completion logic detects an interrupt, the interrupt priority logic 128 determines that an interrupt is to be serviced and it signals the instruction fetch controls. This signal causes the decoder to initiate milli-mode. The recognition of an interruption condition causes the processor to halt System 390 mode execution at the next interruptible point. The interrupt priority logic 128 also generates control inputs which are used by the milli-mode detection logic to generate an entry point address with which to address the millicode array 108. The entry point address is used to address the millicode array 108 and those milli-instructions are fetched from the millicode array 108. These milli-instructions are send to the Instruction Registers 106 where the decoder 110 decodes them and schedules them for execution at the appropriate hardware execution units 112.

The processor proceeds to decode, execute and complete the milli-instruction in the milli-routine for interrupts. Eventually, the decoder 110 recognizes a Millicode END (MEND) milli-instruction. This causes the decoder 110 to stop decoding in milli-mode.

Depending on whether or not there are additional interrupts that require servicing, the decoder hardware will either redo the interrupt process or return to decoding System 390 instructions from the cache 104.

When decoding 390 instructions, the DRAL is updated and when completing 390 instructions, the CRAL is updated. In a similar manner, when decoding milli-instructions, the MDRAL is updated and when completing milli-instructions, the MCRAL is updated. When millicode mode is entered, say via a millicoded instruction, part of the millicode mode setup includes copying the contents of the DRAL to the MDRAL (another embodiment would be to have the MDRAL normally track the DRAL in which case copying of the DRAL to the MDRAL would not be necessary). The decoder 110 switches to using the MDRAL to record logical to physical register relationships. Once the decoder 110 has switched to the MDRAL, the DRAL is frozen and thus will reflect the register assignments just prior to the entry into millicode mode. Once all of the conceptually previous 390 instructions in the pipeline complete, the CRAL will reflect that state also. On decode of the MEND instruction, the GPR mask is be used to selectively update the DRAL for subsequent use by the 390 instruction stream.

A similar operation takes place in the completion logic. Once it is determined that millicode instructions are completing in milli-mode, the completion logic switches to the MCRAL and stops updating the CRAL (in effect, freezing the contents of the CRAL). On completion of the MEND instruction, the GPR Mask is used to selectively update the CRAL for subsequent 390 use.

The number of physical registers available to the millicode is 16 less than the total number in the register array (the register array can include for example, 128 physical registers in total). This is because the physical registers representing the original GPRs will be preserved until the end of the milli-routine is encountered and millicode mode ended (via execution of milli-instruction MEND). This means that milli-routines have access to the original GPR values because they are not destroyed.

An important function in a machine of this type is a fast reset of pipeline controls (pipeline reset). Pipeline reset is the act of canceling all activity in the processor that is associated with instructions that have not yet completed. During a pipeline reset, all processes that have not made permanent modifications to architected facilities are cancelled and execution is resumed at some known point. This is useful for recovery from various conditions that otherwise might cause system damage: i.e., intermittent hardware malfunctions, certain manifestations of multiprocessor operation on shared storage, etc.

The state of the machine is determined by the state of facilities observed at instruction completion time. Only at completion are architected facilities irrevocably modified. The process of resetting the pipeline, then, involves setting decode controls to reflect the state of the completion controls and restarting decode from the instruction immediately following the most recently completed instruction. The facilities of interest in this discussion are those that are directly involved with controlling register allocation: the DRAL, MDRAL, CRAL, and MCRAL.

When, for whatever reason, it is determined that the pipeline should be reset, the DRAL and MDRAL need to be modified to reflect the state of the CRAL and MCRAL. The CRAL and MCRAL may be left unmodified, since the reset condition implies that Decode and Completion are reflecting the same state of the machine.

The modification of these facilities is summarized in Table 1. The conditions that must be considered are listed below. The nomenclature used to describe the various stages the pipeline may be in is: xyz, where x is the state of the Decoder, y is the state of the intermediate pipeline, and z is the state of the Instruction Completion logic. Each may be in the 390 state (3), the Milli-mode state (M), or the "don't care" state (X).

1. Decoder in 390 mode, Completion in 390 mode (3X3)

2. Decoder in Milli-mode, Completion in 390 mode (MX3)

3. Decoder in Milli-mode, Completion in Milli-mode (MXM)

4. Decoder in 390 mode, Completion in Milli-mode (3XM)

Other variations such as 3M3 (Decoder in 390 mode, Milli-mode instructions in the pipeline, Completion in 390 mode) need not be considered since the facilities being modified only exist in Decode or Completion. The only concern is the status of registers in the completion area and this is covered by maintenance of the MCB in the CRAL.

On pipeline reset, the DRAL and MDRAL are modified differently depending on whether we are decoding/completing 390 instructions or Milli-instructions. For example, as illustrated in Table 1, the MDRAL will be reset to the CRAL for the case where we are decoding and completing 390 operations (3X3), and to the MCRAL when we are decoding and completing millicode operations (MXM). In fact, if we replace the "don't cares" (indicated by "X") with MCRAL for the DRAL reset row and "=" for the CRAL row, the following becomes true: The DRAL and MDRAL are modified by the "active" CRAL in the Completion logic (CRAL for 390 and MCRAL for Milli-mode) and the CRAL and MCRAL remain unchanged.

Registers that are in use but not yet reflected in the CRAL/MCRAL must be returned to the FREE STACK during pipeline reset. This function is performed by the completion logic 114 as part of its normal, non-millicode mode, pipeline reset function.

TABLE 1

| Facility to be Modified by Pipeline Reset | 3X3 | MX3 | MXM | 3XM |
|---|---|---|---|---|
| DRAL | CRAL | CRAL | X | X |
| MDRAL | CRAL | CRAL | MCRAL | MCRAL |
| CRAL | = | = | X | X |
| MCRAL | = | = | = | = |

This invention permits overlapped execution of millicode with 390 instructions at both the start and end of a millicode routine. This overlap achieves higher overall system performance. The invention also provides a mechanism for preserving the architected state of the processor during the transitions to millicode, within millicode, and during the transition from millicode. The invention provides a pipeline retry mechanism while in millicode or in a transition to or from millicode. It also provides the pipeline retry mechanism for 390 mode.

b. Register Operand Registers

The milli-routine must have access to read and write the general purpose registers (GPRs) in order to access the operands of the System 390 instruction and to transfer the results of the milli-routine's execution to the System 390 GPRs. The particular case of interruptible instructions causes some special control and performance problems. An interruptible instruction must periodically pause (at the end of a unit of operation) and allow its execution to stop if there are pending interrupts awaiting service.

In a machine where the interruptible instruction happens to be implemented with millicode, the unit of operation will consist of a loop within the milli-routine. This loop will cause the System 390 facilities to be properly updated to reflect the end of a unit of operation. The loop then issues a Millicode End (MEND) instruction with a qualifier that indicates that this is an interruptible point. If there are pending interrupts, the milli-routine implementing the instruction is ended and the interrupt serviced, if not, the milli-routine may proceed through another unit of operation.

As explained with reference to the embodiment of FIG. 1, the mechanism to update the System 390 registers is a mask (in the GPR update logics 144, 146) with a one for one correspondence between the milli-registers and the GPRs. If a bit in the mask is one then the GPR corresponding to it is updated from the milli-register corresponding to it. When the System 390 instruction always updates a fixed GPR, (say GPR 2) this works well. Consider what must be done when the System 390 instruction that caused entry into the millimode specifies which GPRs to update. First, the instruction text must be examined to construct the mask bits. This is straightforward, but time consuming. Second, within the loop, an EXECUTE instruction must be used with a subject of a LOAD register to cause the data to be placed in the corresponding milli-register. It is this EXECUTE of a LOAD Register that causes the fundamental control problem.

The effect of the EXECUTE of a LOAD Register is to move the data to the milli-register corresponding to the GPR that the instruction specified. This is fine, in so far as updating the correct GPR is concerned, but when the conditional MEND finds that the interruptible instruction is to be continued, the loop in the milli-routine can be hopelessly compromised because the EXECUTE of LOAD Registers have moved data around in the milli-registers and the coder cannot know which registers have been modified. When the target registers happen, through bad luck, to be the ones controlling the loop, improper execution can result. This is the control problem.

The inventors have discovered that many of the above-described control and performance problems can be minimized or eliminated. Accordingly, in the embodiment of FIG. 6 the register management system is provided of a set of registers (the Register Operand Registers) that are initialized by the decoder hardware to remember all the GPRs referenced by the System 390 instruction that caused the entry to millicode. There are unique milli-mode instructions that reference the Register Operand Registers.

The provision of RORs enables the milli-routine to have access to the contents of the the GPRs and the GPR values while leaving the GPRs isolated from the milli-registers so that fast pipeline reset is always possible.

Figure 6:
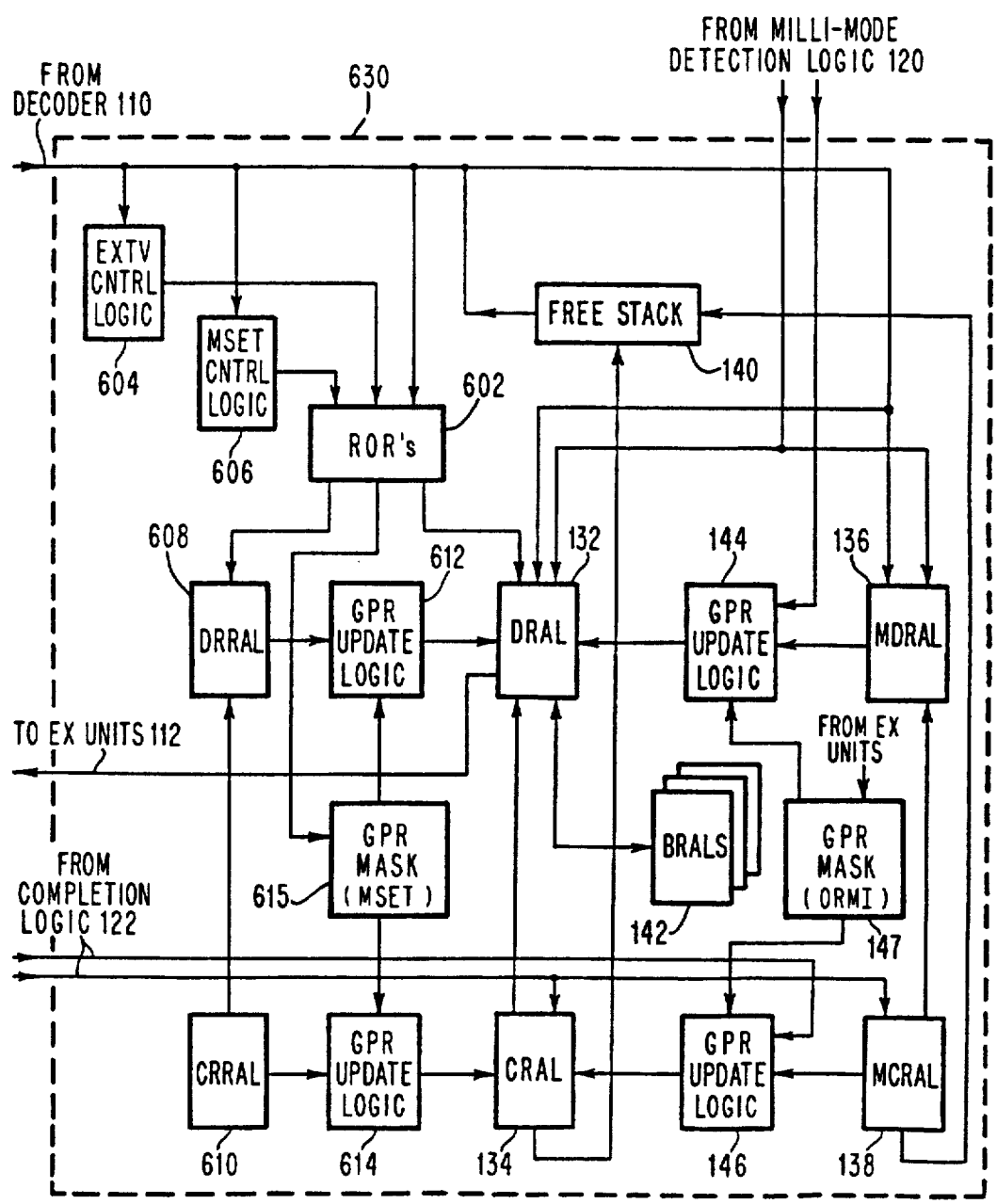
FIG. 6 is a diagram of a register management system having register-operand-registers.

FIG. 6 is a functional diagram of a register management system 630 including register operand registers and the associated support functions. The RMS 630 of FIG. 6 is used in conjunction with the system of FIG. 1 as an alternative to RMS 130. Like numbered components of the RMS 630 that appear in both FIGS. 1 and 6 are identical. The RALs 132-138, 142, the FREE STACK 140 and the GPR update logics 144, 144 are all interconnected with each other and with the system in the same way as described with reference to the embodiment of FIG. 1.

In addition to the components in the embodiment of FIG. 1, the RMS 630 of FIG. 6 includes the following:
Register Operand Registers (RORs) 602;
EXTV control logic 604 connected to receive a source ROR identifier from the decoder 110 and connected to provide the identifier to the RORs 602;
MSET control logic 608 connected to receive a sink ROR identifier from the decoder 110 and connected to provide the identifier to the RORs;
A decode ROR register assignment list (DRRAL) 610 connected to receive a register identifier from the RORs 602;
A completion ROR register assignment list (CRRAL) 612 connected to the completion logic 172 and the DRRAL 610 for keeping track of the ROR values at milli-instruction completion time;
Explicit GPR update logics 614, 616 for respectively performing a masked copy between the DRRAL 610 and the DRAL 132 and the CRRAL 612 and the CRAL 134.
An MSET GPR mask 615.

The Register Operand Registers (RORs) 602 are a set of registers each of sufficient width to identify the GPRs. (There are implementation options, the RORs could identify the GPRs, they could hold copies of the contents of the GPRs, or they could hold physical register IDs of the assigned physical registers and include a physical/logical register translation table similar to the DRAL). In the presently described embodiment, the RORs identify the GPR's.

There must be enough RORs to identify all the GPRs specified by any System 390 instruction which is implemented with millicode. For System 390 instructions implemented in millicode, six RORs each having a width of four bits are sufficient. For System 390, the RORs are initialized differently depending upon the format of the System 390 instruction causing entry into milli-mode.

The RORs 604 are initialized (by the decoder 110) when a 390 instruction implemented in millicode is detected. The RORs are used by the milli-routine to gain access to the explicit register operands of the 390 instruction.

Table 2 (below) shows how the RORs are to be initialized.

TABLE 2

| ROR # | RR,RRE | RX | RS | SI | S | SS,SSE | SS3* |
|-------|--------|-----|------|-----|-----|--------|------|
| 0 | R1 | R1 | R1 | B2 | B1 | B1 | R1 |
| 1 | R2 | X2 | R3 | n/u | n/u | R1 | R3 |
| 2 | R2+1 | B2 | B2 | n/u | n/u | B2 | B2 |
| 3 | R1+1 | n/u | R3+1 | n/u | n/u | n/u | R3+1 |
| 4 | n/u | n/u | B2+1 | n/u | n/u | n/u | B1 |
| 5 | n/u | n/u | R1+1 | n/u | n/u | n/u | R1+1 |

*SS3 refers to SS format instructions where R1 and R3 are specified in bits 8:15.

Along the top line of table 2, RR, RRE, RX, SI, S, SS, SSE and SS3 are IBM System 370 and 390 instruction formats of the type which are well know in the art, and described in more detail in the "IBM Enterprise Systems Architecture/390 Principles of Operation" (Publication Number SA22-7201-0, Available from IBM Corporation, Armonk, N.Y.) which is incorporated by reference, in its entirety, as if printed in full below. R1, R2, R3, B1, B2, and X2 are register identifying fields within the appropriate instruction formats. The letters "n/u" indicate that the specified ROR is not used (not loaded by the decoder) for the indicated instruction format.

For example, the compare and swap instruction is of the RS format, specifically CS R1,R3,D2(B2). Assume that a specific compare and swap instruction is as follows:

BA578000 (hexadecimal)
where BA is the Op code, R1=GPR5, R3=GPR7 and B2=GPR8. When the decoder encounters this instruction it will recognize it as being of an RS format. Thus, in accordance with Table 2, the decoder will load the RORs as follows:

ROR0=5
ROR1=7
ROR2=8
ROR3=8
ROR4=9
ROR5=6

There are two basic milli-instructions used to gain access to the explicit register operands of the 390 instructions. These milli-instructions are EXTV (EXTRACT VIA ROR) and MSET (SET VIA ROR).

EXTV is used when the milli-routine wishes to read the explicit register operands. The operands of EXTV are a milli-register (sink) and an ROR (source). The coder uses the Table 2 (above) to decide what ROR to use.

The EXTV control logic 604 is connected to receive the EXTV source (an ROR identifier) from the decoder 110. In response to a control signal from the decoder 110, the EXTV control logic 604 reads out a logical register ID from the ROR position designated by the EXTV instruction. The logical register ID from the ROR is then provided to the DRAL 132, where it is used to read out from the physical register ID. That physical register ID is then used as the source for a load register type instruction (executed by one of the hardware execution units). The physical sink register for the EXTV instruction (which is to receive the contents of the specified source physical register) is provided by the FREE STACK 140.

When the milli-routine needs to update an explicit register operand of the 390 instruction, the MSET milli-instruction is used. Its source operand is a milli-register and its sink operand is pointed to by an ROR identifier.

The MSET control logic 606 is connected to receive the MSET instruction sink (an ROR identifier) from the decoder 110. In response to a control signal from the decoder 110, the MSET control logic 606 reads out a logical register ID from the designated ROR position. The logical register ID is then used to set a corresponding bit in the MSET GPR update logic mask 615, which designates a position in the DRRAL 608. A load register type instruction is scheduled for execution with the source being the milli-register and the sink being a register from the free stack. The physical register ID of the register from the free stack is written to DRRAL 608 at the position just read out from the ROR.

The DRRAL 608 is used as the temporary storage when milli-routines update explicitly named GPRs through the RORs 602. (Explicit register reference means the 390 instruction that invoked millicode named the register, implicit register reference means the instruction always modifies a fixed GPR that is NOT named by the instruction.) The DRRAL has the same structure as the DRAL (there is one slot/position in the DRRAL corresponding to each architected logical register). The CRRAL 610 has the same structure as the DRRAL except that the register assignments stored in the CRRAL refer to completion time (as opposed to decode time as with the DRRAL). The CRRAL is connected to the DRRAL so that the contents of the CRRAL can be copied into the DRRAL when a pipeline reset occurs.

For example, the DRRAL and CRRAL can be manipulated with an MSET instruction as follows:

MSET 1,10

Which means that milli-register 10 has the information that is to be placed in the GPR that ROR #1 is referencing (ROR #1 contains a logical register identifier).

Lets suppose that ROR #1 is pointing at GPR 7. When MSET decodes, an available physical register is taken from the FREE STACK and its identifier is written in into DRRAL slot 7. At the same time, the explicit GPR mask bit corresponding to GPR 7 is set to 1. Next, a load register operation is scheduled for execution. When executed, the load register operation copies the contents of the physical register identified in MDRAL slot 10 (the source) to the physical register identified in DRRAL slot 7 (the sink). When the MSET instruction completes, the physical register identifier in DRRAL slot 7 is also written in CRRAL slot 7. This is so the CRRAL 610 can update the DRRAL 608 if the pipeline has to be reset (in the same way as the CRAL 134 is copied to the DRAL 132 and the MCRAL 138 is copied the MDRAL 136).

When millicode end is decoded, any changes made to the DRRAL 608 (by execution of MSET milli-instructions) are copied to the DRAL 132 via the GPR Update Logic 612. In the present example, the physical register identifier in DRRAL slot 7 would be copied into DRAL slot 7. When MEND is completed, the same changes are made to the CRAL 134 by copying changes in the CRRAL via the GPR update logic 614.

The explicit GPR update logics 612, 614 are identical to the implicit GPR update logics 144, 146 except that the former pair of update logics access a separate register mask from the one used by the implicit GPR update logics 144, 146.

For implicit register updates, a different scheme is used. In this case, the coder knows what GPR will be updated. He arranges to leave the correct information in the corresponding milli-register. A milli-instruction (ORMI) is issued to set a mask (see 502 of FIG. 5) whose bits correspond 1 for 1 with the GPRs. Thus, if GPR 4 is to be changed, the information for it is left in MR4 at MEND time. The ORMI instruction will set bit 4 of the GPR mask.

At MEND decode, whatever GPRs have their mask bit set (by ORMI), the corresponding MDRAL 136 slots are copied to the DRAL 132 by the implicit GPR update logic 144. This updates the DRAL so that decoding of 390 instructions can proceed on the next cycle. At MEND completion, whatever GPRs have their mask bits set by ORMI, the corresponding MCRAL slots are copied to the CRAL 134 by way of GPR update logic 146.

c. Drain Instruction Pipeline

In order to provide an enhanced level of flexibility and efficiency, the systems of FIGS. 1 and 6 include a milli-instruction that causes the pipeline to drain. This milli-instruction, called DRAIN INSTRUCTION PIPELINE (DIP) allows greater selectivity by the coder over (1) when to drain the pipeline and (2) what type of pipeline drain to perform. The DIP instruction enables the coder cause the system to suspend decoding until a selected event occurs.

In the System 370/System 390 environments, the DIP instruction is preferably of an RRE format. The DIP instruction 702, illustrated in more detail in FIG. 7, includes a four bit S1 field that enables the coder to select from a number of options. These options are illustrated in FIG. 8 (Table 802) and described in more detail below.

When the S1 field is set to 0010, decoding is suspended until the cache 104 indicates that all store requests have reached the point where no exceptions will occur, but the actual store may not have completed. The decoder 110 monitors signals from the storage system 102. Decoding resumes when, the cache 104 sends a signal to the decoder 110 to indicate that that all store pretests have successfully completed.

When the S1 field is set to 0100, decoding is suspended until all conceptually previous milli-code instructions have completed. The decoder 110 monitors signals from the completion logic 122 that indicate that the completion logic has completed all conceptually previous milli-instructions.

When the S1 field is set to 0110, decoding is suspended until all conceptually previous stores from all conceptually previous units-of-operation have completed (serialize). A unit of operation is any non-interruptible instruction or a defined portion of an interruptible instruction (as discussed further in the IBM Enterprise Systems/370 Principles of Operation). The decoder 110 monitors status signals from the cache 104. Decoding resumes when the cache 104 sends a signal to the decoder 110 indicating that all stores from earlier units of operation are complete.

When the S1 field is set to 1000, decoding is suspended until all conceptually previous macro (System 390) instructions have completed. The decoder 110 monitors signals from the completion logic 122 that indicate that the completion logic has completed all conceptually previous System 390 instructions.

When the S1 field is set to 1010, decoding is suspended starting directly after decode of the next MEND instruction. When the DIP instruction completes (as indicated by a signal from the completion logic 122 to the decoder 110) the system invalidates all of the instruction buffers holding System 390 instructions and fetches the next sequential System 390 instructions. This DIP instruction is used when a milli-instruction might have changed the address space where the next System 390 instruction is fetched from (e.g. when a milli-routine changes IBM System 390 control register 1 or control register 13, the address translation controls in control register 0, or the PSW address space controls) and is inserted directly following the milli-instruction that might cause the change.

When the S1 field is set to 1100, decoding is suspended until all conceptually previous instructions have completed. The decoder 110 monitors signals from the completion logic 122 that indicate that the completion logic has completed all instructions.

When the S1 field is set to 1110, decoding is suspended starting directly after decode of the next MEND instruction. When the DIP instruction completes, fetching is resumed. This DIP instruction is used when a milli-instruction might have changed the instruction address where the next System 390 instruction is fetched from or where a DIP instruction changes a control register that might effect the processors instruction fetching ability (e.g. by enabling or disabling fetch protection) or the program event recorder (PER) (e.g. when a milli-routine changes IBM System 370/390 control registers 0, 9, 10 or 11) and is inserted directly following the milli-instruction that might cause the change.

If neither DIP 1110 or DIP 1010 are encountered in a milli-routine, System 390 instruction fetching is restarted as soon as an MEND is decoded.

S1 field values not described above can either be left unused or can be used for other drain events, such as those based on architecture or design specific features.

The above-described principles are applicable not only to machines the have conventional microcode or an interpretive type of execution mode, but to any system that uses or requires an explicit serialization or drain pipeline instruction.

d. Features and Advantages

The above-described milli-mode system is advantageous in a number of ways.

The above-described system provides an efficient way to implement dual architectures in a CISC computer. This is because the decoder, at least some execution units, and the completion hardware are cognizant of about both the user visible architecture (e.g. System 390) and the private millicode architecture. In the preferred embodiment, the System 390 architecture is augmented with milli-instructions to produce a millicode architecture. This means that the millicode architecture need not rearchitect many existing instructions (e.g. LOAD). One could choose to implement an entirely different architecture as the millicode architecture.

The present system also enables overlapped execution of the milli-code and System 390 instructions at both the start and end of a milli-routine. This overlap achieves higher overall system performance. The system also provides a mechanism for preserving the architected state of the processor during the transitions from System 390 mode to milli-mode, within milli-mode and from milli-mode to System 390 mode. The present system also provides a pipeline retry mechanism while in milli-mode or in a transition to or from milli-mode.

The present system provides efficient communications between the dual architectures. Communication between the System 390 and Millicode architectures is accomplished because the Millicode routine can access the System 390 facilities to obtain information, and it can place values in these System 390 facilities (e.g. General Purpose Registers (GPRs), Access Registers (ARs), Floating Point Registers (FPRs), Control Registers (CRs), Program Status Word (PSW), and storage.)

The present system may be augmented to include separate Millicode architected facilities. In other words, the millicode architecture can be provided with its own facilities (e.g. not System 390 facilities.)

The present system can be modified to enable Dynamic switching of 390 instructions into Millicode. It is possible to cause an instruction originally defined to be implemented in H/W to be executed in millicode by changing some tables that the decoder uses. A milli-routine to perform the function must be loaded into the millicode array at the entry point the decoder will use. If that routine exists in the millicode array, this could be done dynamically.

The provision of RORs also provides a number of advantages.

RORs permit GPRs specified by a System 390 instruction to be observed and modified directly by a millicode routine without introducing the overhead and added execution time of the previously described means.

The ROR mechanism applies equally well to Access Register and Floating Point Register access by a milli-routine.

The coder can load a milli-register with a System 390 GPR specified operand without examining the System 390 instruction text and using the EXECUTE instruction with a target of a Load Register instruction. The EXECUTE instruction is known to be a poor performer by its nature. EXECUTE modifies an instruction; this must be fetched, modified, and the result decoded before it can proceed. This disrupts the pipeline. Accessing GPR specified operands is commonly done in millicode. Thus, many milli-mode routines can be written in fewer instructions and they will execute more efficiently.

In the case of interruptible instructions that write GPR's that they specify, in addition to the above, a full milli-register save and restore is avoided in the loop that implements the unit of operation. The overhead of the register save and restore is substantial.

RORs enable the millicode programmer to write more understandable code. It is much clearer to issue an instruction in milli-mode that means 'put register operand 3 into milli-register x' than the alternative.

RORS enable GPR modifications to be reversible. The GPR modification is delayed until the end of milli-mode. Thus, the effects of an MSET milli-instruction are reversible until completion of the MEND instruction.

Now that the invention has been described in detail, various modifications and improvements will become apparent to those of skill in the art. Thus it should be understood that the preferred embodiments of the present invention have been described by way of example and not by way of limitation. The scope of the invention is defined by the appended claims.

Having thus described our invention, what we desire to secure by Letters Patent is:

1. A computer, comprising:
   a) first memory means for storing a first type of instructions including at least one instruction designated for interpretive execution;
   b) second memory means for storing a second type of instructions, said second type of instructions comprising a third type of instructions designated to be used only for interpretive execution of said at least one instruction, a subset of said first type of instructions, and at least one instruction designated for ending said interpretive execution;
   c) an instruction pipeline including a decoder section and an execution unit,
      i) the decoder section comprising:
         mode detection means for detecting the fetching from the first memory means, of said at least one instruction designated for interpretive execution and for initiating fetching of said second type of instructions from said second memory in response thereto, said mode detection means further comprising means for detecting the fetching from the second memory, of said at least one instruction designated for ending said interpretive execution and for initiating fetching of the first type of instructions from the first memory in response thereto; and
         a decoder coupled to said mode detection means;
      ii) said execution unit comprising means for executing both the first and third type of instructions;
   d) a register pool coupled to said execution unit, said register pool comprising a plurality of physical registers for use in common by said first type of instructions and said second type of instructions; and;
   e) register management means, coupled to said decoder, said register pool and said execution unit, for tracking usage of said physical registers by each of the first and the types of instructions;
   wherein the first and third types of instructions can be executed by a single execution unit and can be simultaneously present in the instruction pipeline.

2. The computer of claim 1 wherein said second memory is not addressable by said first type of instructions.

3. The computer of claim 1 wherein said means for executing comprises macro-execution means for executing said first type of instructions and milli-execution means for executing said third type of instructions, said means for executing further comprising a local working storage for temporarily storing results of execution of said second type of instructions.

4. The computer of claim 1 wherein said register management means comprises:
   a decode register assignment list (DRAL) means for tracking correspondence between logical registers referenced by said first type of instructions and said physical registers in said register pool;
   a millicode decode register assignment list (MDRAL) means for tracking correspondence between logical milli-registers used by said second type of instructions and said physical registers in said register pool;

first update means, coupled to said mode detection means, said DRAL means and said MDRAL means for performing a masked copy from said MDRAL means to said DRAL means in response to detection of said instruction designated to end interpretive execution by said mode detection means.

5. The computer of claim 4 further comprising:

completion detection means for detecting completion of instructions executed by said execution unit;

wherein said register management system further comprises:

a completion register assignment list (CRAL) means, coupled to said completion detection means and said DRAL means, for tracking correspondence between said logical registers referenced by completed ones of said first type of instructions and said physical registers in said register pool and for providing said DRAL with copies of logical to physical register assignments upon an execution of a pipeline reset by said execution unit;

a millicode completion register assignment list (MCRAL) means, coupled to said completion detection means and said MDRAL means, for tracking correspondence between logical milli-registers used by said completed ones of said second type of instructions and physical registers in said register pool and for providing said DRAL with copies of logical to physical register assignments upon an execution of a pipeline reset by said execution unit; and;

second update means, coupled to said mode detection means, said CRAL means and said MCRAL means for performing a masked copy from said MCRAL means to said CRAL means in response to detection of completion said instruction designated to end interpretive execution by said completion detection means.

6. The computer system of claim 1 wherein said register management means comprises:

register operand register means, coupled to said decoder, for storing logical register identifiers provided by at least one of said first type of instructions;

a decode register assignment list (DRAL) means, coupled to said decoder and said execution unit, for tracking correspondence between general purpose registers used by said first type of instructions and physical registers in said register pool;

a millicode decode register-operand register assignment list (DRRAL) means for tracking correspondence between milli-registers identified by said second type of instructions and physical registers in said register pool;

update means, coupled to said execution unit, said DRAL means and said DRRAL means for performing a masked copy from said MDRAL means to said DRAL means in response to a load-type instruction executed by said execution unit.

7. The computer of claim 6, wherein said decoder comprises table means for loading said register operand register means with logical register identifiers in response to an operation code of a decoding one of said first type of instructions.

8. The computer of claim 6, further comprising:

completion detection means for detecting completion of instructions executed by said execution unit;

wherein said register management system further comprises:

a completion register-operand register assignment list (CRRAL) means, coupled to said completion detection means and said CRAL means, for tracking correspondence between milli-registers used by completed ones of said at least one of said third type of instructions and physical registers in said register pool and for providing said DRRAL with copies of logical to physical register assignments upon an execution of a pipeline reset by said execution unit.

9. The computer of claim 8 wherein said update means is coupled to said completion detection means, and wherein a second masked copy is performed between said CRRAL means and said CRAL means responsive to completion of said at least one instruction designated for ending said interpretive execution.

10. A computer system, comprising:

a) first memory means for storing a first type of instructions including at least one instruction designated for interpretive execution;

b) second memory means for storing a second type of instructions, said second type of instructions comprising a third type of instructions designated to be used only for interpretive execution of said at least one instruction, a subset of said first type of instructions, and at least one instruction designated for ending said interpretive execution;

c) an instruction pipeline including a decoder section and an execution unit, i) the decoder section comprising:

mode detection means for detecting the fetching from the first memory means, of said at least one instruction designated for interpretive execution and for initiating fetching of said second type of instructions from said second memory in response thereto, said mode detection means further comprising means for detecting the fetching from the second memory, of said at least one instruction designated for ending said interpretive execution and for initiating fetching of the first type of instructions from the first memory in response thereto;

a decoder coupled to said mode detection means;

ii) said execution unit comprising:

macro-execution means for executing said first type of instructions, milli-execution means for executing said second type of instructions, a local working storage and means for causing results of execution of said second type of instruction to be held in said local working storage until said at least one instruction designated for ending said interpretive execution is executed;

d) a register pool coupled to said execution unit, said register pool comprising a plurality of registers for use in common by said first type of instructions and said third type of instructions; and;

e) completion detection means for detecting completion of instructions executed by said execution unit;

f) register management means, coupled to said decoder, said register pool and said execution unit, for tracking usage of said registers by each of the first and the types of instructions;

said register management means comprising:

decode register assignment list (DRAL) means for tracking correspondence between general purpose registers used by said first type of instructions and physical registers in said register pool;

millicode decode register assignment list (MDRAL) means for tracking correspondence between milli-registers used by said second type of instructions and physical registers in said register pool;

first update means, coupled to said mode detection means, said DRAL means and said MDRAL means for performing a masked copy from said MDRAL means to said DRAL means in response to detection of said instruction designated to end interpretive execution by said mode detection means;

completion register assignment list (CRAL) means, coupled to said completion detection means and said DRAL means, for tracking correspondence between general purpose registers used by completed ones of said first type of instructions and physical registers in said register pool and for providing said DRAL with copies of logical to physical register assignments upon an execution of a pipeline reset;

millicode completion register assignment list (MCRAL) means, coupled to said completion detection means and said MDRAL means, for tracking correspondence between milli-registers used by said completed ones second type of instructions and physical registers in said register pool and for providing said DRAL with copies of logical to physical register assignments upon an execution of a pipeline reset;

second update means, coupled to said mode detection means, said CRAL means and said MCRAL means for performing a masked copy from said MCRAL means to said CRAL means in response to detection of completion said instruction designated to end interpretive execution by said completion detection means;

register operand register means, coupled to said decoder, for storing logical register identifiers provided by at least one of said first type of instructions;

a millicode decode register-operand register assignment list (DRRAL) means for tracking correspondence between milli-registers identified by said second type of instructions and physical registers in said register pool;

update means, coupled to said execution unit, said DRAL means and said MDRRAL means for performing a masked copy from said MDRAL means to said DRAL means in response to a load register type instruction executed by said execution unit; and completion register-operand register assignment list (CRRAL) means, coupled to said completion detection means said DRRAL means and said CRAL means, for tracking correspondence between milli-registers used by completed ones of said at least one of said third type of instructions and physical registers in said register pool and for providing said DRRAL means with copies of logical to physical register assignments upon an execution of a pipeline reset;

wherein said decoder comprises table means for loading said register operand register means with logical register identifiers in response to an operation code of a decoding one of said first type of instructions.

11. In a computer system having an execution unit capable of processing instructions of at least two different architectures, a method of communicating results of instructions between architectures comprising the steps of:

decoding a first instruction having a first architecture;

performing a first assigning of a physical register from a common register pool to receive results for at least one logical register specified by said first instruction;

storing the results of said first assigning in a first table;

scheduling said first instruction for execution;

while said first instruction is executing, decoding a second instruction having a second architecture;

performing a second assigning of a physical register from said common register pool to receive results for at least logical register specified by said second instruction;

storing the results of said second assigning in a second table;

scheduling said second instruction for execution;

completing said first instruction;

after said completing of said first instruction, storing results of said first assigning in a third table and completing said second instruction; and after said second instruction has completed, storing results of said second assigning in a fourth table and performing a masked copy of said fourth table into said third table.

* * * * *